Nelson Warren and Thos. Underwood.
Improvement in Jump-Seats.

No. 121,563.

Patented Dec. 5, 1871.

Witnesses.
J. C. Wilworth
F. O. Snow

Inventors:
Nelson Warren & Thos. Underwood
By Attys. A. L. & W. Intire & Co.

121,563

UNITED STATES PATENT OFFICE.

NELSON WARREN AND THOMAS UNDERWOOD, OF WILMINGTON, DELAWARE.

IMPROVEMENT IN JUMP-SEATS.

Specification forming part of Letters Patent No. 121,563, dated December 5, 1871; antedated November 18, 1871.

*To all whom it may concern:*

Be it known that we, NELSON WARREN and THOMAS UNDERWOOD, of Wilmington, in the county of New Castle and State of Delaware, have invented certain new and useful Improvements in Jump-Seats for Vehicles; and we do hereby declare that the following is a full and exact description thereof, reference being had to the accompanying drawing making a part of this specification.

Our invention has for its object to provide an economical, simple, and effective means of converting a vehicle from a single to a double-seated one, and vice versa; and consists: First, in constructing the swinging parallel arms of the "jump" seats with a curved or angular finger which shall come in contact at the proper time with the bearing-plate on the under side of the seat. Second, in the construction of the bearing-plate, secured to the under side of the seat, so as to form pivot-bearings for the arms, and a rest against which the curved or angular fingers shall impinge in one and the same casting. Third, in an automatically-operating spring-bar under the forward seat, with downwardly-projecting bearings, against which the fingers of the parallel arms shall rest when said seat is in position for use, the said projections being withdrawn from over the fingers and releasing the same, as will be hereinafter more fully set forth. Fourth, in an auxiliary or independent support attached to the plate, upon which the lower ends of the parallel arms are pivoted, so constructed and applied that it will serve its purpose in either of two natural positions of the seat, as will be presently more fully explained.

To enable those skilled to more fully understand the nature of our invention, we will proceed to describe the construction and operation of the same, referring by letters to the accompanying drawing, in which—

Figure 1:
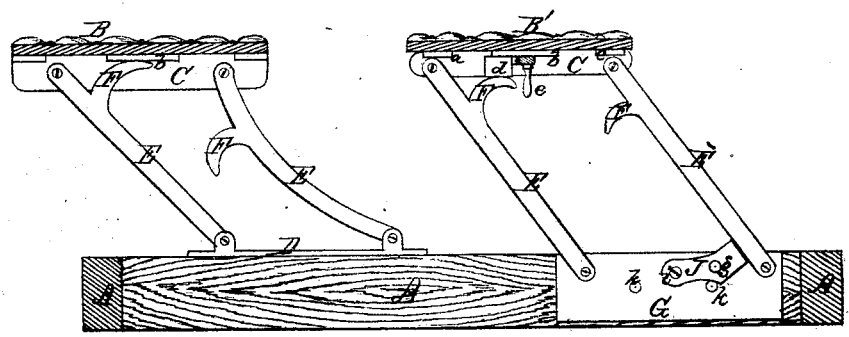
Figure 2:
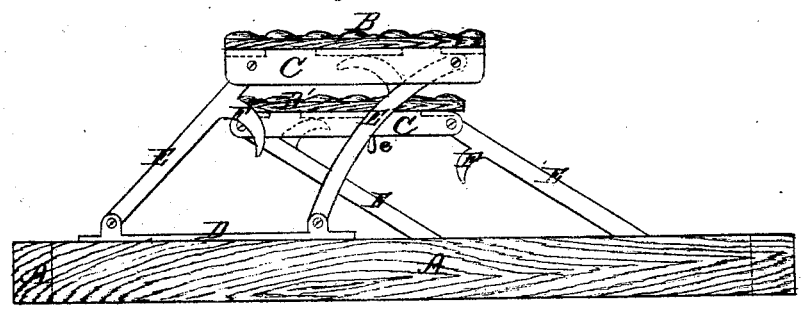
Figure 3:
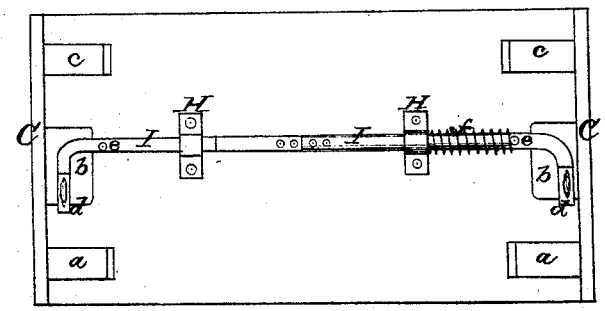

Figure 1 is a longitudinal vertical section of a frame or body of a vehicle with the two seats in position for a double-seated vehicle. Fig. 2 is a side elevation, showing the seats after having jumped to form a single-seated vehicle; and Fig. 3 is a bottom view of the forward seat, showing the automatically-operating spring-bar.

Similar letters indicate like parts in the several views.

A represents the frame or body of a vehicle, and B B' the rear and forward seats. C are right-angled bearing-plates, which are secured to the under side of the seats, flush with their ends, by screws or bolts passing through those portions of the plate in contact with the bottom surface of the seat. It will be seen by reference to Fig. 3 that parts of the plate are cut away for sake of economy and lightness, leaving three ears, as it were—*a b c*—the central one *b* forming a bearing-plate, against which the curved or angular fingers of the parallel arms come in contact. The downwardly-projecting part of these plates forms the bearing to which the arms are hinged or pivoted, as clearly seen in the drawing. The lower ends of the arms supporting the rear seat are hinged to a plate, D, in the usual manner. The arms E are all, except forward ones on rear seat, made straight, with an angular or curved finger, F, so constructed that when the arms are swung backward or forward to carry the seats to either of their natural positions the said fingers will bear alternately against the central ear *b* of the plates C', the rear arms of each seat forming the supports when both seats are in use, and the forward ones when only the back seat is in use or the vehicle converted into a single-seated one. It will be seen that the weight upon the seat is borne upon one side, as it were, of an equilateral triangle. The forward arms of the rear seat are so curved that they shall form no impediment to ingress and egress when both seats are in use. The arms supporting the forward seat are screwed to the plate C the same as those of the rear seat, but the lower ends, instead of being pivoted to a hinged plate, D, are pivoted to a simple flat plate, G, which is securely fastened to the inside of the frame A. To the under side of the front seat is secured, by boxes H, a spring-bar, I, having its ends "returned," and with a downwardly-projecting bearing-face, *d*, either end of said rod or bar having handles *e e*, by which it is readily operated. This bar is made in two sections. The inner ends of each are "halved" to lap, and provided with two or more rivet-holes, the object being to accommodate the bar to seats of different lengths. One-half of said bar is rounded from a point just behind the handle *e* to receive a spiral spring, *f*, which spring is confined between the shoulder back of handle *e* and the box H; the bar is prevented from being thrown too far by the spring by a shoulder bearing against the ear $b$ of the plate C. It will be seen that the bar can be readily operated from either end of the seat. The bearings $d$ have a slight depression on their face, which assists in providing for the proper adjustment of said bearing and the curved fingers F. On the plate G is pivoted a block, J, having a knob or handle, $g$, by which it is swung upon its center $i$. Said block is held in proper position to form a supporting-shoulder to the front or rear arms F, alternately, by the pins $k\ k$. This block J is an excellent auxiliary to the supporting-arms E; or in some instances it may be made to serve individually as the only and a good support; or it may be entirely dispensed with.

The operation of our improvement is as follows: Assuming the vehicle to be a double-seated one, as seen at Fig. 1, and desiring to convert it into a single-seated vehicle, the front seat is slightly raised, and either one of the handles $e$ is grasped and pushed in the direction reverse to that exerted by the spiral spring $f$, thus forcing both the bearings $d$ off the curved fingers F, one to outside and the other to inside of said fingers. The seat is then dropped backwardly until the curved fingers of the rear arms rest against the bearing-ear or plate $b$, which will leave the forward seat in the position as seen at Fig. 2. The back seat is made to cover the same and assume the position seen in said Fig. 2 by simply swinging it upon its parallel arms until the curved fingers of the front arms shall strike and rest against the same ear or plate $b$, which the fingers of the rear arm rested against when the seat was back. To carry the seats back to the positions seen at Fig. 1 the rear seat is simply swung back until it finds a support on the forward arms, and the front seat is then swung forward, and the moment it has arrived at the proper point the spring-bar I forces itself back to its normal position, thus bringing its downwardly-projecting bearings $d$ immediately over the fingers F of the rear arms E, the two assuming their relative proper position as soon as the seat is released. It will be here observed that even if the seat is carried too far forward in dropping back it cannot go too far but must strike the bearings $d$ of the spring-bar I. When the seat is thrown to its furthest extent forward the fingers of the forward arms rest against the ears $b$ just behind the returned ends of the bar I, in a similar manner to the rear seat when thrown forward. The auxiliary and independent support G needs no further description, and its operation is evident.

Having described the construction and operation of our improvements in jump-seats, what we claim as new, and desire to secure by Letters Patent, is—

1. The parallel swinging arms E, with fingers F, in combination with the bearing-plate or ear $b$ of the plate C, as and for the purposes hereinbefore set forth.

2. The bearing-plate C, forming pivot-bearings for the arms E and a rest for the fingers F of said arms, when constructed substantially as herein shown and described.

3. The automatically-operating spring bar I, constructed and operating substantially in the manner and for the purposes set forth.

4. The swinging block J, constructed as shown and described, and pivoted to plate G, in combination with the supporting-pins $k\ k$, either as an auxiliary or independent means of supporting the seat, as hereinbefore set forth.

Witness our hands and seals to the foregoing specification this 21st day of April, A. D. 1871.

NELSON WARREN. [L. S.]
THOS. UNDERWOOD. [L. S.]

Witnesses:
E. B. FRAZER,
JAMES C. STOCK.

(31)